United States Patent [19]

Hubler

[11] 4,358,644

[45] Nov. 9, 1982

[54] BILATERAL CURRENT SOURCE FOR A MULTI-TERMINAL INTERCOM

[75] Inventor: Stanley L. Hubler, Saugus, Calif.

[73] Assignee: RTS Systems, Inc., Burbank, Calif.

[21] Appl. No.: 160,158

[22] Filed: Jun. 17, 1980

[51] Int. Cl.³ .............................................. H04B 1/58
[52] U.S. Cl. ........................... 179/170 NC; 179/81 B
[58] Field of Search .......... 179/81 B, 170 NC, 170 T, 179/70, 77

[56] References Cited

U.S. PATENT DOCUMENTS

| | | | |
|---|---|---|---|
| 3,480,742 | 11/1969 | Gaunt, Jr. .................... | 179/170 NC |
| 3,751,602 | 8/1973 | Breeden ............................ | 179/81 B |
| 4,001,524 | 1/1977 | Prudhon et al. ................. | 179/170 T |
| 4,192,978 | 3/1980 | Vincent ............................ | 179/81 B |

FOREIGN PATENT DOCUMENTS

| | | | |
|---|---|---|---|
| 2019395 | 11/1971 | Fed. Rep. of Germany .... | 179/81 B |
| 54-100211 | 8/1979 | Japan ........................... | 179/170 NC |

Primary Examiner—Bernard Konick
Assistant Examiner—Randall P. Myers
Attorney, Agent, or Firm—Christie, Parker & Hale

[57] ABSTRACT

A bilateral current source operates as a two-wire to four-wire converter circuit for an intercom system. The circuit provides a high impedance current driver for putting a local voice signal on the common line connecting the intercom stations. The same circuit acts as a buffer amplifier for connecting voice signals received on the same line to a listening device such as a speaker. The circuit suppresses any sidetones by preventing the local voice signal from being coupled to the listening device.

9 Claims, 2 Drawing Figures

BILATERAL CURRENT SOURCE FOR A MULTI-TERMINAL INTERCOM

FIELD OF THE INVENTION

This invention relates to audio circuits for an intercom system, and more particularly, to a bilateral current source which operates as a two-wire to four-wire converter.

BACKGROUND OF THE INVENTION

In an intercom system which is designed for two-way communication between a plurality of stations, it is standard practice to connect all the stations by a single wire pair. Since each station both transmits and receives signals on this same common pair of wires, some local means is necessary to isolate the receiving circuit or load from the transmitting circuit or local source. This has been accomplished in various ways, such as by use of the transformer hybrid circuit commonly used in telephone circuits and by sidetone suppressor circuits which cancel out the local voice signal from the speaker output.

The present invention is an improvement in that it provides a simpler and more reliable circuit which functions as a bilateral current source for both driving all the other receiving stations on the line from the local source (microphone or the like) and also providing an output to the local load (speaker, earphone, or the like) from the signal received on the line from other stations. It presents a high input impedance to the line, allowing a number of stations to be connected to the line. At the same time the circuit provides the two-wire to four-wire conversion by suppressing sidetones in the output to the receiver or local load.

SUMMARY OF THE INVENTION

These and other advantages of the present invention are achieved by a circuit comprising a differential type operational amplifier having the local voice signal connected to the negative input through a first resistor, the input being also connected to the output terminal of the amplifier by a second resistor. A potentiometer is connected in shunt across the two resistors, the tap on the potentiometer providing the output to the local receiver. The communication line is connected to the positive input of the amplifier by a third resistor and to the output terminal by a fourth resistor in series with the third resistor and that is small in value compared to the other resistors. The positive input is also connected to a reference potential source through fifth resistor. The amplifier acts as a high impedance current source for transmitting voice signals to the line and acts as a buffer for signals received from the line. Sidetones from the local voice signal are canceled out of the signal to the receiver by the potentiometer.

BRIEF DESCRIPTION OF THE DRAWINGS

For a better understanding of the invention reference should be made to the accompanying drawings, wherein.

DETAILED DESCRIPTION

Figure 1:
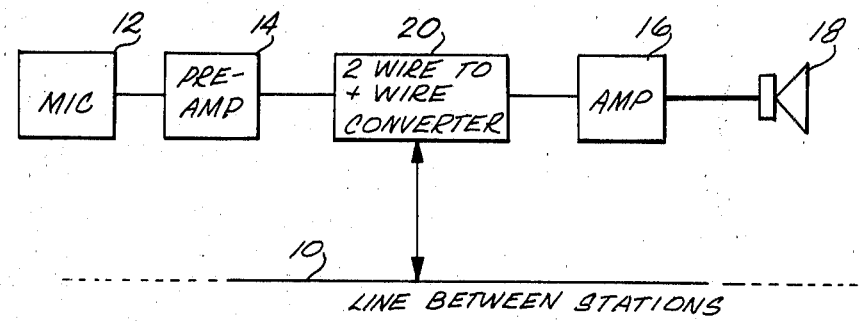
FIG. 1 is a block digram of one station in an intercom system.

Referring to the drawings in detail, FIG. 1 shows one station of a multi-station intercom system in which all of the stations are connected by a two-wire communication line 10. Each station includes a transmitter or local audio signal source, such as a microphone 12 and preamplifier 14. Each station further has a receiver or local audio load including an amplifier 16 and a speaker, earphone or other audio transducer 18. A two-wire to four-wire converter circuit 20 operates to connect the voice signal from the transmitter to the line 10 for transmission to other stations. The converter 20 also couples signals received on the line from other stations to the receiver. The converter provides isolation of the local receiver from the voice signal output of the local transmitter. It also provides a high impedance voltage controlled current source connected to the line 10 so as to minimize the loading effect of multiple stations on the line.

Figure 2:
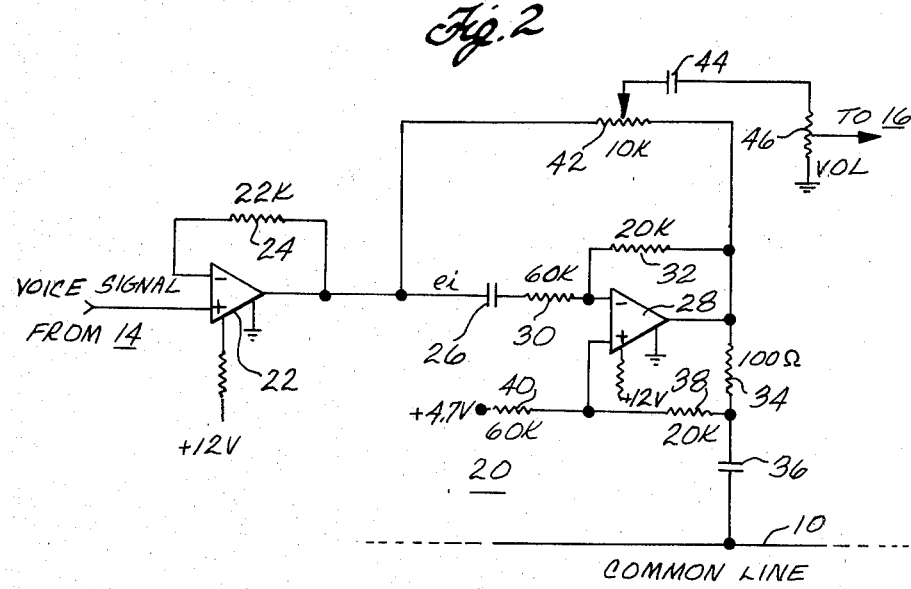
FIG. 2 is a schematic circuit diagram of the two-wire to four-wire converter of the present invention.

Referring to FIG. 2, the two-wire to four-wire converter circuit 20 is shown in detail. The voice signal from the preamplifier 14 is connected to the positive input of a differential type operational amplifier 22. The negative input of the differential amplifier 22 is also connected to the output terminal through a feedback resistor 24. Amplifier 22 functions only as a buffer, having substantial unity gain. The voice signal at the output of the amplifier 22 typically has a voltage of the order of 3 volts peak to peak. The buffer circuit operates as a very low impedance source of the voice signal.

The output is coupled through an isolation capacitor 26 to the negative input of a second differential type operational amplifier 28 through a series resistor 30. A feedback resistor 32 connects the output terminal of the amplifier 28 to the negative input terminal. The output terminal of the amplifier is connected through a relatively small resistor 34 to the line 10 through another isolation capcitor 36. The junction between the resistor 34 and the capacitor 36 is connected to the positive terminal of the differential amplifier 28 through a resistor 38. Also the positive input terminal of the amplifier 28 is connected to a reference voltage source through a resistor 40. The resistors 30 and 40 are preferably of equal value as are the resistors 32 and 38. While isolation capacitors 26, 36, and 44 are shown, it will be appreciated that direct coupling may be used if the d.c. reference voltages are set at the proper levels for the various solid state elements in the amplifiers connected by the common line. The capacitors merely provide coupling of the a.c. audio signal while allowing the coupled circuit elements to operate at whatever d.c. levels are available.

As thus far described, the circuit operates as a high impedance voltage controlled current source for transmitting a voice signal on the common line 10. The transconductance of the circuit is given by the following expressions $i_o/e_i = R32/(R30 \times R34)$, where
$R40/R30 = R38/R32$. $i_o$ is the output current through resistor 34 and $e_i$ is the input voltage.

Thus for the values shown, the transconductance is equal to $20,000/(60,000 \times 100) = 0.0033$ amperes/volt.

The output impedance is given by the following expression $$Z_0 = \left| \frac{\frac{R32}{R30}}{\frac{R32}{R30} - \frac{R38}{R40}} \times R34 \right|.$$

For one percent resistors, the minimum output impedance, $$Z_0 \text{ is equal to } \left| \frac{\frac{20}{60}}{.01 \times \frac{20}{60}} \times 100 \text{ ohms} \right| = 10,000 \text{ ohms}.$$

Assuming a 1.5 volt input signal, the circuit therefore provides a driving current of 5 milliamps at a source impedance in excess of 10,000 ohms. The resistor 34 is made small, preferably less than one percent of the resistor 38, to get the desired transconductance.

Signals received from other stations over the line 10 are applied to the positive input terminal of the differential amplifier 28. In the receiving mode, the amplifier 28 acts as a buffer amplifier in the same manner as the amplifier 22. The signal received from the line 10 is applied to the receiver amplifier 16 through a potentiometer 42, capacitor 44 and volume control potentiometer 46. To prevent any sidetones resulting from the local voice signal being coupled to the receiving amplifier 16, the other end of the potentiometer 42 is connected to the output terminal of the buffer amplifier 22. Because the differential amplifier 28 inverts the input signal, the signals at opposite ends of the potentiometer resulting from the local voice signal are of opposite phase. Therefore, by adjusting the tap on the potentiometer 42, the potentiometer can be set at a null point where the two signals exactly balance each other out. The tap on the potentiometer will be centered if $e_o = -1 \cdot e_i$ where $e_o$ is the voltage at the output of the amplifier 28. This condition will apply if $R32/R30 = R_L/R_L + R34$, where $R_L$ is the impedance of the line 10, which typically is 200 ohms. As a result, the local voice signal does not produce any sidetone on the local receiver.

From the above description it will be seen that the present invention provides a bilateral current source for putting a voice signal on the line or driving the receiver from a voice signal received over the line. The circuit functions as a two-wire to four-wire converter since the circuit isolates the voice signal source from the local receiver by virtue of the null balance effect of the potentiometer 42. The circuit acts like a relatively high impedance converted to the common line and therefore a large number of terminals can be connected to the line without loading the line. The circuit does not function to terminate the line and therefore does not have to match the impedance of the line. While the circuit has been described in its preferred embodiment for coupling audio signals to or from a common line in an intercom system, the circuit is not limited to only audio signals, but is applicable to use with a digital bus in a data processing system, for example.

What is claimed is:

1. In a system having a plurality of stations for either transmitting or receiving signals over a single line pair, a two-wire to four-wire converter circuit, comprising: a differential amplifier having first and second input terminals and an output terminal, a signal source, means including a first resistor connecting the first input terminal of the differential amplifier to said source, asecond resistor connecting the second input terminal to a reference voltage, a first feedback resistor connecting the first input terminal to the output terminal of the amplifier, second and third feedback resistors in series connecting the second input terminal to the output terminal of the amplifier, impedance means including a potentiometer connected in shunt across the amplifier and first resistor between the source and the output terminal of the amplifier, an output load connected to the tap of the potentiometer for preventing signals from said signal source from appearing at said output load, and means connecting one wire of said line to the series junction of said second and third feedback resistors.

2. The circuit of claim 1 wherein said second feedback resistor is connected to the output terminal and is less than 10 percent of the resistance value of the first feedback resistor.

3. The circuit of claim 2 where the ratio of said first resistor and the first feedback resistor is equal to the ratio of the second resistor and the third feedback resistor.

4. A circuit for transmitting an audio signal from a local source to a communication line and for coupling an audio signal received on the line to a local load, said circuit comprising:

a differential type operational amplifier having a negative input terminal, a positive input terminal and an output terminal, means including a first resistor connecting the audio signal from said local source to the negative input terminal, a second resistor connecting a reference voltage to the positive input terminal, a third resistor connecting the output terminal to the negative input terminal, fourth and fifth series resistors connecting the output terminal to the positive input terminal, first impedance means connecting the input to the first resistor from the local source to said output terminal, means connecting the local load to the output terminal through a portion of the first impedance means for preventing signals from said local source from appearing at said local load, and second impedance means connecting the communication line to the series junction between the fourth and fifth resistors.

5. Apparatus of claim 4 wherein said first impedance means includes a potentiometer having an adjustable tap, means connecting one end of the potentiometer to the local source, means connecting the other end of the potentiometer to the output terminal, and means connecting said load to said tap.

6. Apparatus of claim 4 wherein the fourth resistor is connected to said output terminal and the fifth resistor is connected to said positive input termnal, the fifth resistor being very much larger than the fourth resistor.

7. Apparatus of claim 6 wherein the first and second resistors have the same resistance value and the third and fifth resistors have the same resistance value.

8. Apparatus of claim 6 wherein the fourth resistor value is less than 1 percent of the fifth resistor value.

9. Apparatus of claim 8 wherein the ratio of the first and third resistor values and the ratio of the second and fifth resistor values are the same.

* * * * *